United States Patent [19]

Sikström

[11] 3,884,099

[45] May 20, 1975

[54] EXPANSION BOLT

[76] Inventor: Karl Birger Sikström, Lilla Gransgatan 2, S-971 00 Malmberget, Sweden

[22] Filed: Apr. 11, 1973

[21] Appl. No.: 349,925

[30] Foreign Application Priority Data

Apr. 13, 1972 Sweden.............................. 4767/72

[52] U.S. Cl......................................... 85/75; 85/87
[51] Int. Cl.............................................. F16b 13/06
[58] Field of Search .............. 85/67, 69, 73, 74, 75, 85/76, 79, 86, 87

[56] References Cited
UNITED STATES PATENTS

| 674,074 | 5/1901 | Bennett................................. 85/75 |
| 777,399 | 12/1904 | Church................................. 85/87 |
| 2,870,666 | 1/1959 | Dempsey ............................. 85/76 |
| 3,022,700 | 2/1962 | Dempsey ............................. 85/76 |
| 3,227,031 | 1/1966 | Williams .............................. 85/67 |
| 3,394,627 | 7/1968 | Metcalfe .............................. 85/79 |

FOREIGN PATENTS OR APPLICATIONS

| 223,908 | 12/1957 | Australia.................................. 85/76 |
| 267,827 | 1/1969 | Australia.................................. 85/75 |
| 1,092,484 | 11/1954 | France..................................... 85/75 |
| 1,486,161 | 5/1967 | France..................................... 85/79 |
| 4,117,770 | 12/1970 | Japan....................................... 85/75 |

Primary Examiner—Marion Parsons, Jr.
Attorney, Agent, or Firm—Ostrolenk, Faber, Gerb & Soffen

[57] ABSTRACT

An expansion bolt has a clamping screw and a tapered expansion member threaded on the screw and actuating a number of clamping jaws which are held in axial engagement with an axial stop member on the screw. The expansion member may be screwed to a position in which it engages the stop member and in this position further expansion is permitted of the jaws to a maximum expanded position which is defined by co-operating abutment surfaces on the expansion body and the jaws.

3 Claims, 7 Drawing Figures

PATENTED MAY 20 1975　　　　　　　　　　　　　　　　　3,884,099
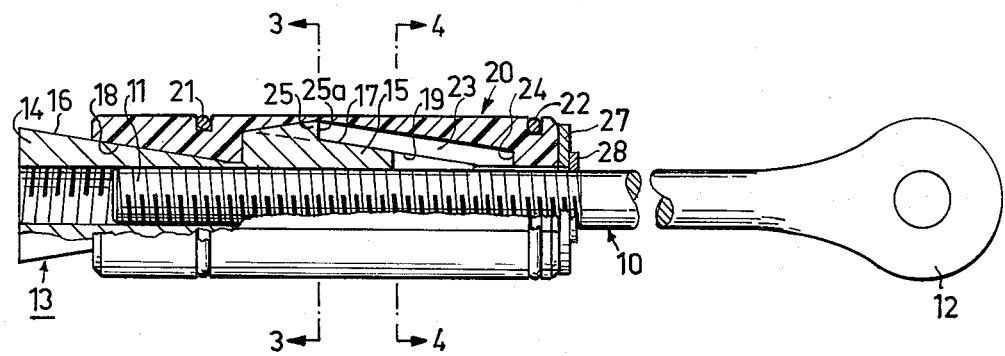
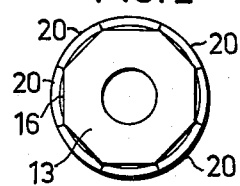 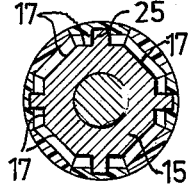 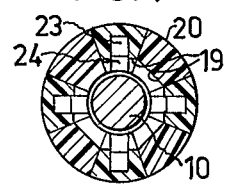
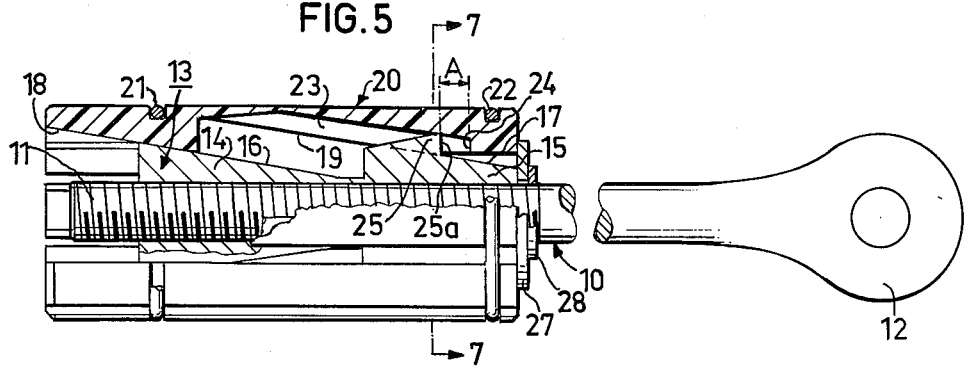
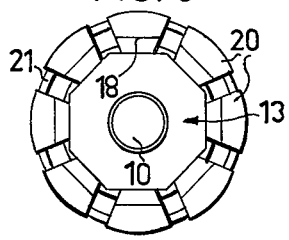 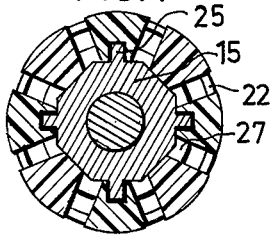

EXPANSION BOLT

The present invention relates to an expansion bolt of the kind comprising a clamping screw and a tapered expansion member having a threaded axial bore to be screwed along the clamping screw and at least one outer wedge surface and a number of clamping jaws arranged around the outside of the expansion member and having each an inner wedge surface in engagement with the outer wedge surface or wedge surfaces of the expansion member, the jaws being retained in engagement with the expansion member by means of at least an elastic member and resting at one end against an axial stop member on the screw when the jaws are held against rotation and the screw is rotated for axial displacement of the expansion member in a direction towards the axial stop member at the same time as the jaws by cooperation of the wedge surfaces with each other are moved radially outwardly.

Such expansion bolts are used for example in mines and are secured in drilled anchoring holes in the rock. The holes extend normally substantially vertically upwardly in the rock. When the jaws have been expanded into engagement with the wall of the anchoring hole the bolt should normally be safely anchored. However, the hole may sometimes be located in relatively soft species of stone and in such cases certain difficulties may arise. The risk is then that the wall of the hole may yield when the bolt has been anchored for some time in the hole and/or has been subjected to additional loads. The size of the hole will thus be increased in the region where the jaws are pressing against the wall of the hole and this will result in that the anchoring capacity of the jaws in the hole will gradually be reduced. In cerain expansion bolts of known types, the expansion member and the clamping screw will under the conditions referred to be displaced axially relative to the jaws, which then will expand and press into the relatively soft material of the wall of the hole and in a certain position the tapered expansion member will leave its engagement with the jaws so that the clamping screw and the expansion member will be pulled out from the hole under the influence of the load suspended from the lower end of the clamping screw.

The object of the present invention is therefore to provide an expansion bolt of the kind under consideration which may be anchored more safely in a hole, particularly when the wall of the hole is more or less yielding for the pressure from the clamping jaws. Further, the expansion bolt should be so constructed that it may be mounted at any place axially within a relatively deep hole which in certain cases may be several times longer than the length of the jaws.

This object is attained by means of an expansion bolt which according to the invention is characterized in that one wedge surface of at least a pair of cooperating inner and outer wedge surfaces is provided with a shoulder or radial projection which is guided in a corresponding longitudinally extending groove in the other wedge surface, that the projection has a substantially radial end surface intended to form an abutment surface and that the grove has a corresponding abutment surface at one of its ends, a predetermined free axial space or distance being provided between said two abutment surfaces when the expansion member has been screwed relative to the clamping screw so that the expansion member will rest with its end against the axial stop member on the screw. The clamping screw may have a length which is several meters, the expansion member with the clamping jaws being located at the inner end portion of the clamping screw to be inserted into a hole having a depth of several meters. The arrangement of the expansion member and the clamping jaws at one end portion of such a long clamping screw is enabled by the fact that the screw is provided with an axial stop which forms a stop member against which one end of the jaws is resting. By rotating the clamping screw relative to the jaws the expansion member may be displaced axially from one end position, where the cylindrical body formed by the jaws has its smallest diameter, to an opposite end position where the expansion member engages the axial stop member on the clamping screw and the jaws are in an outer position which, however, according to the invention will not be the maximum expanded position. Due to the pre-determined free axial space or distance between the abutment surfaces of the radial projection and the corresponding abutment surface of the groove, said axial space will allow the clamping screw with the expansion member to be displaced axially relative to the jaws until said abutment surfaces are brought into contact with each other. During said relative axial displacement there will be a continued expansion of the jaws, the size of the additional expansion depending on the tapering degree of the wedge surfaces and on the size of said axial free space. The position thus obtained will be the maximum expanded position of the expansion body. Further displacement of the clamping screw relative to the jaws is not possible because the two cooperating abutment surfaces form a lock which prevents that the clamping screw with the expansion member will be pulled out from the jaws. Thus, if an expansion bolt according to the invention is anchored in a hole by expanding the jaws until the expansion member is brought into abutment with the axial stop member on the clamping screw and the jaws have reached a safe grip in the wall of the hole, there will be a certain extra safety precaution according to the invention due to the fact that if the wall of the hole would yield under the pressure from the jaws, these jaws may expand further to a certain limit so that the grip of the jaws in the wall of the hole will be increased which may be obtained without any risk that the screw with the conical member may be pulled out from the jaws. This guarantee against pulling out of the screw from the jaws is of course obtained also when the expansion member has been screwed to an intermediate position where it is not in engagement with the axial stop member. If sufficient anchoring is obtained in such an intermediate position for the expansion member, the same security will be obtained as described above in the event that the wall of the hole should yield upon increased load or upon vibrations which occur in connection with stone-blasting operations in mines. If the wall of the hole under these conditions should yield more or less, the clamping screw with the expansion member will be displaced axially relative to the jaws until said abutment surfaces engage each other whereupon continued displacement of the clamping screw with the expansion member relative to the jaws is prevented.

A preferred embodiment of the expansion bolt according to the invention will be described with reference to the accompanying drawings.

FIG. 1 is a longitudinal section of the expansion bolt with the clamping jaws in their radially inner end position, FIG. 2 is an end view of the bolt, FIG. 3 is a section along line 3—3 in FIG. 1, FIG. 4 is a cross section according to line 4—4 in FIG. 1, FIG. 5 is the same longitudinal section as in FIG. 1 except for the difference that the expansion member is in abutment at one end with an axial stop member on the clamping screw and the jaws are expanded to an outer position, FIG. 6 is an end view of the expansion bolt in FIG. 5 and FIG. 7 is a cross section along line 7—7 in FIG. 1.

The clamping screw 10 in FIGS. 1 and 5 is shown in a broken view which merely shows the inner threaded end portion 11 of the clamping screw and its outer end portion 12 provided with an eye or other head. The whole length of the screw 10 may be several meters but is normally about half a meter.

On the threaded end portion of the screw 10 is threaded an expansion member 13 which consists of two coaxial cones 14, 15. As will be seen from FIGS. 2, 3 and 4, these cones have a hexagonal cross section so that the cones have each eight flat outer wedge surfaces 16 and 17 respectively.

Each pair of wedge surfaces 16, 17 lying axially after one another cooperates with corresponding flat inner wedge surfaces 18, 19 of a clamping jaw 10, said wedge surfaces lying axially after one another. There are eight such expansion jaws around the expansion member 13 as will be understood from FIGS. 3 and 4.

The eight jaws 20 are held in engagement with the expansion member 13 by means of two elastic members in the form of rings 21 and 22 of elastic material.

In every second wedge surface 19 of the eight flat wedge surfaces 19 cooperating with the cone 15 is provided an axial groove 23 having one end shaped to form a substantially radial end surface 24 adapted to serve as an abutment surface for a radial tooth, shoulder or projection 25 which forms a radial projection at every second wedge surface 17 at the wider end of the cone 15. Each projection 25 has a radial end surface 25a which forms an abutment surface adapted to cooperate with the abutment surface 24 at the end of the groove 23 under certain conditions which will be described below.

The screw 10 is furthermore provided with an axial stop member in the form of two washers 27, 28 which form an abutment for one end of the jaws 20 as will be seen from FIGS. 1 and 5. A single washer may be used.

The jaws 20 are advantageously made of plastics which is somewhat elastic so that the jaws may adapt themselves to any irregularities in the hole when the jaws are subjected to high expansion forces from the expansion member.

When the cylindrical expansion body comprising the jaws 20 is in its starting position according to FIG. 1 the expansion bolt may be inserted into a hole in the rock or any other place. The depth of the hole may be several times longer than the length of the jaws. When the bolt has been inserted to the desired position in the hole, the cylindrical expansion body is tilted somewhat so that the jaws will engage the wall of the hole. Thereafter the screw 10 is rotated and the jaws will then be in engagement with the wall of the hole and are thus prevented from rotating. The expansion member 13 is also effectively prevented from rotating relative to the jaws because the flat wedge surfaces 16, 17 of the expansion member 13 are in contact with the corresponding flat wedge surfaces 18, 19 of the jaws 20. The threaded end portion 11 of the screw 10 will thus be screwed relative to the threads of the bore of the expansion member 13 which results in that the expansion member upon this relative screw movement will be displaced towards the stop member 27, 28 and exert a radial pressure on the jaws. These jaws cannot be displaced axially because they are resting against the axial stop member 27, 28. Upon the movement of the expansion member 13 towards the stop member 27, 28 the jaws 20 will thus be pressed radially outwardly to engagement with the wall of the actual stone material or other material in which the hole is located.

If the wall of the hole is of relatively soft material, it may occur that the jaws 20 are expanded to the position shown in FIG. 5 where the expansion member with one end will rest against the stop member 27, 28. If the hole has merely somewhat greater diameter than the expansion body in FIG. 1, it may be possible in some instances to expand the expansion body to the position shown in FIG. 5. This will mean that a corresponding local widening of the hole has been obtained in the region at the jaws 20. If the jaws are located relatively deep within the hole in the stone the anchoring of the expansion bolt will thus remain very effective.

However, if the expansion bolt should be influenced by undesirable loads or vibrations it may occur that the hole of the wall will yield further. This results in that the jaws will remain substantially in the same axial position in the hole whereas the screw 10 with the expansion member 13 will be displaced axially relative to the jaws. This is enabled due to the fact that there is a predetermined free axial distance A or space between the abutment surfaces 26, 24 in the position according to FIG. 5. Upon this relative movement the jaws will thus be expanded radially outwardly to further increase the diameter of the cylindrical expansion body and thus the jaws will be prevented from loosening their grip in the wall of the hole. When the relative axial displacement is so great that the abutment surfaces 26, 24 are in contact with each other the screw 10 with the expansion member 13 will no longer be displaced relative to the jaws 20. In this position, the projections or teeth 25 will function as stop members to safely prevent the screw with the expansion member 13 to be pulled out from the expansion body formed by the jaws 20. Instead, the expansion body will form an anchoring body secured to the screw and having a relatively great diameter which is located in a widened portion of the inner end portion of the hole in the rock or other material. Thus, the expansion bolt according to the invention will be anchored with a high degree of safety in the hole, although this hole may be located in a relatively soft stone material.

If desired, the expansion body may consist of two axially spaced groups of jaws, where one of the groups has wedge surfaces 18 and the other has wedge surfaces 19 and grooves 23 therein. Alternatively, these two groups of jaws may be axially separated by means of an intermediate sleeve. By this arrangement of axially spaced groups of jaws, the two groups may be formed with different kinds of wedge surfaces and have different starting inner positions so that the expansion body formed by these two groups of jaws may expand differently at its two ends if so desired.

When the expansion bolt is inserted in a hole having a wall of hard material which will not yield under the pressure from the clamping jaws, an increased axial load on the bolt will increase the pressure on the jaws and thus increase their frictional engagement with the wall of the hole. This will particularly be the case when the jaws are made of plastics which is somewhat elastic so that the jaws will adapt themselves to the surface of the hole or bore.

What I claim is:

1. An expansion bolt comprising a threaded claimping screw, a tapered expansion member having a tapped bore threadedly engaging the screw and having at least one outer wedge surface and a number of clamping jaws having each of its inner wedge surfaces cooperating with an outer wedge surface of the tapered expansion member, the jaws being retained in engagement with the tapered expansion member by means of an elastic member and in abutment at one of their ends with an axial stop member on the screw when the jaws are held against rotation and the screw is rotated for axial displacement of the expansion member in a direction towards the axial stop member at the same time as the jaws by cooperation between the outer and inner wedge surfaces will be moved radially outwardly, characterized in that one of the wedge surfaces of at least a pair of cooperating outer and inner wedge surfaces is provided with a radial projection which is guided in a corresponding longitudinal groove in the outer wedge surface, that the projection is formed with a substantially radial end surface adapted to form an abutment surface, and that the groove has a corresponding abutment surface at one of its ends, there being provided a predetermined free axial space or distance between said abutment surfaces when the tapered expansion member has been screwed relative to the claimping screw so far that the conical member abuts the axial stop member on the screw and prevented from further screwing relative to the expansion member, whereby subsequent simultaneous axial movement of the screw and the expansion member relative to the jaws until the abutment surfaces engage one another expands the jaws still further.

2. An expansion bolt according to claim 1 having at least two coaxial groups of outer and inner wedge surfaces arrayed along the same axis and characterized in that said projections are provided at least in connection with one of said groups of wedge surfaces.

3. An expansion bolt according to claim 1, characterized in that the wedge surfaces are flat and form an acute angle with the longitudinal axis of the bolt.

* * * * *